(12) United States Patent
Banh et al.

(10) Patent No.: US 12,485,629 B2
(45) Date of Patent: Dec. 2, 2025

(54) RESTART ASSEMBLY FOR AN AUTOMATED FIBER PLACEMENT HEAD

(71) Applicant: The Boeing Company, Arlington, VA (US)

(72) Inventors: Dung L. Banh, Mt. Pleasant, SC (US); Walter W. Jackson, Bonneau, SC (US)

(73) Assignee: The Boeing Company, Arlington, VA (US)

( * ) Notice: Subject to any disclaimer, the term of this patent is extended or adjusted under 35 U.S.C. 154(b) by 246 days.

(21) Appl. No.: 18/364,306

(22) Filed: Aug. 2, 2023

(65) Prior Publication Data

US 2025/0042104 A1 Feb. 6, 2025

(51) Int. Cl.
*B29C 70/38* (2006.01)

(52) U.S. Cl.
CPC .................. *B29C 70/384* (2013.01)

(58) Field of Classification Search
CPC ............... B29C 70/384; B29C 70/545; Y10T 156/1378; Y10T 156/1317; Y10T 156/1322; Y10T 156/17
See application file for complete search history.

(56) References Cited

U.S. PATENT DOCUMENTS

| | | | | |
|---|---|---|---|---|
| 3,641,643 A | * | 2/1972 | Niemi | B27D 3/00 156/579 |
| 7,367,213 B2 | * | 5/2008 | Wong | G01N 3/04 73/12.06 |
| 7,849,903 B2 | | 12/2010 | Vaniglia | |
| 8,733,417 B2 | * | 5/2014 | Hamlyn | B29C 70/384 156/425 |

* cited by examiner

*Primary Examiner* — George R Koch
*Assistant Examiner* — Christopher C Caillouet
(74) *Attorney, Agent, or Firm* — Yee & Associates, P.C.

(57) ABSTRACT

A restart assembly for an automated fiber placement head is presented. The restart assembly for the automated fiber placement head comprises a plurality of pneumatic cylinders, each pneumatic cylinder of the plurality of pneumatic cylinders comprising an extendable piston rod; a plurality of restart rollers, each restart roller of the plurality of restart rollers connected to a respective extendable piston rod of the plurality of pneumatic cylinders, a rotational axis of each restart roller of the plurality of restart rollers perpendicular to the respective extendable piston rod connected to the restart roller.

20 Claims, 11 Drawing Sheets

RESTART ASSEMBLY FOR AN AUTOMATED FIBER PLACEMENT HEAD

BACKGROUND INFORMATION

1. Field

The present disclosure relates generally to automated fiber placement heads, and more specifically to the restart assembly of an automated fiber placement head.

2. Background

Automated fiber placement heads can be used to apply composite material to a substrate. In the automated fiber placement head, a restart assembly supplies the composite material to a compression roller. Restart rollers of the restart assembly are individually activated to selectively engage appropriate restart rollers. The restart rollers are activated by respective pneumatic cylinders. The compression roller of the automated fiber placement head then applies the composite material onto the substrate.

Conventional restart assembly designs have a high level of complexity. Conventional restart assembly designs can have undesirably high material costs and undesirably high maintenance frequency. Additionally, in the conventional restart assembly design, the entire assembly is disassembled for replacing any component and maintenance. Conventional restart assembly designs can result in undesirably high amounts of downtime for maintenance due to maintenance frequency and disassembly complexity.

Therefore, it would be desirable to have a method and apparatus that takes into account at least some of the issues discussed above, as well as other possible issues.

SUMMARY

An embodiment of the present disclosure provides a restart assembly for an automated fiber placement head. The restart assembly comprises a plurality of pneumatic cylinders and a plurality of restart rollers. Each pneumatic cylinder of the plurality of pneumatic cylinders comprises an extendable piston rod. Each restart roller of the plurality of restart rollers is connected to a respective extendable piston rod of the plurality of pneumatic cylinders. A rotational axis of each restart roller of the plurality of restart rollers is perpendicular to the respective extendable piston rod connected to the restart roller.

Another embodiment of the present disclosure provides an automated fiber placement head. The automated fiber placement head comprises a compression roller; a plurality of spools of composite material; and a restart assembly positioned between the plurality of spools of composite material and the compression roller and configured to direct composite material from the plurality of spools to the compression roller. The restart assembly comprises a plurality of pneumatic cylinders, each pneumatic cylinder of the plurality of pneumatic cylinders comprising an extendable piston rod; and a plurality of restart rollers, each restart roller of the plurality of restart rollers connected to a respective extendable piston rod of the plurality of pneumatic cylinders, movement of the plurality of restart rollers parallel to the movement of the respective extendable piston rod.

A further embodiment of the present disclosure provides a method of assembling a restart assembly of an automated fiber placement head. A plurality of pneumatic cylinders is mounted to a frame perpendicular to a direction of movement of extendable piston rods of the plurality of pneumatic cylinders. A plurality of restart rollers is connected to the plurality of pneumatic cylinders such that each restart roller of the plurality of restart rollers is connected to a respective extendable piston rod of the plurality of pneumatic cylinders and a rotational axis of each restart roller of the plurality of restart rollers is perpendicular to the respective extendable piston rod connected to the restart roller.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that in conventional assemblies the pneumatic air cylinders are placed horizontally. In conventional assemblies, the pneumatic air cylinders are actuated and pivoted, bringing down a respective roller assembly on each air cylinder. The illustrative examples recognize and take into account that due to the horizontal placement of a conventional pneumatic air cylinder and space constraints, a respective shaft is bent over time. Additionally, friction is created between the shaft and the cylinder. The friction leads to delay feeding out the fiber strips. Thus, the air cylinders on the assembly are replaced several times within a year.

The illustrative examples provide a new restart assembly design that mounts the pneumatic cylinders vertically. The vertical positioning enables the shafts of the pneumatic cylinders to move in a direction parallel to the movement of the restart rollers. The pneumatic cylinders are smaller than the conventional horizontal cylinders in order to fit the tight space.

The illustrative examples provide restart assemblies with fewer parts and that are simplified for maintenance. The illustrative examples allow for maintenance without disassembly of the whole assembly. Movement of the extendable piston shafts in the same direction of the restart rollers results in a restart assembly with fewer parts and a lower cost than conventional restart assemblies.

Figure 1:
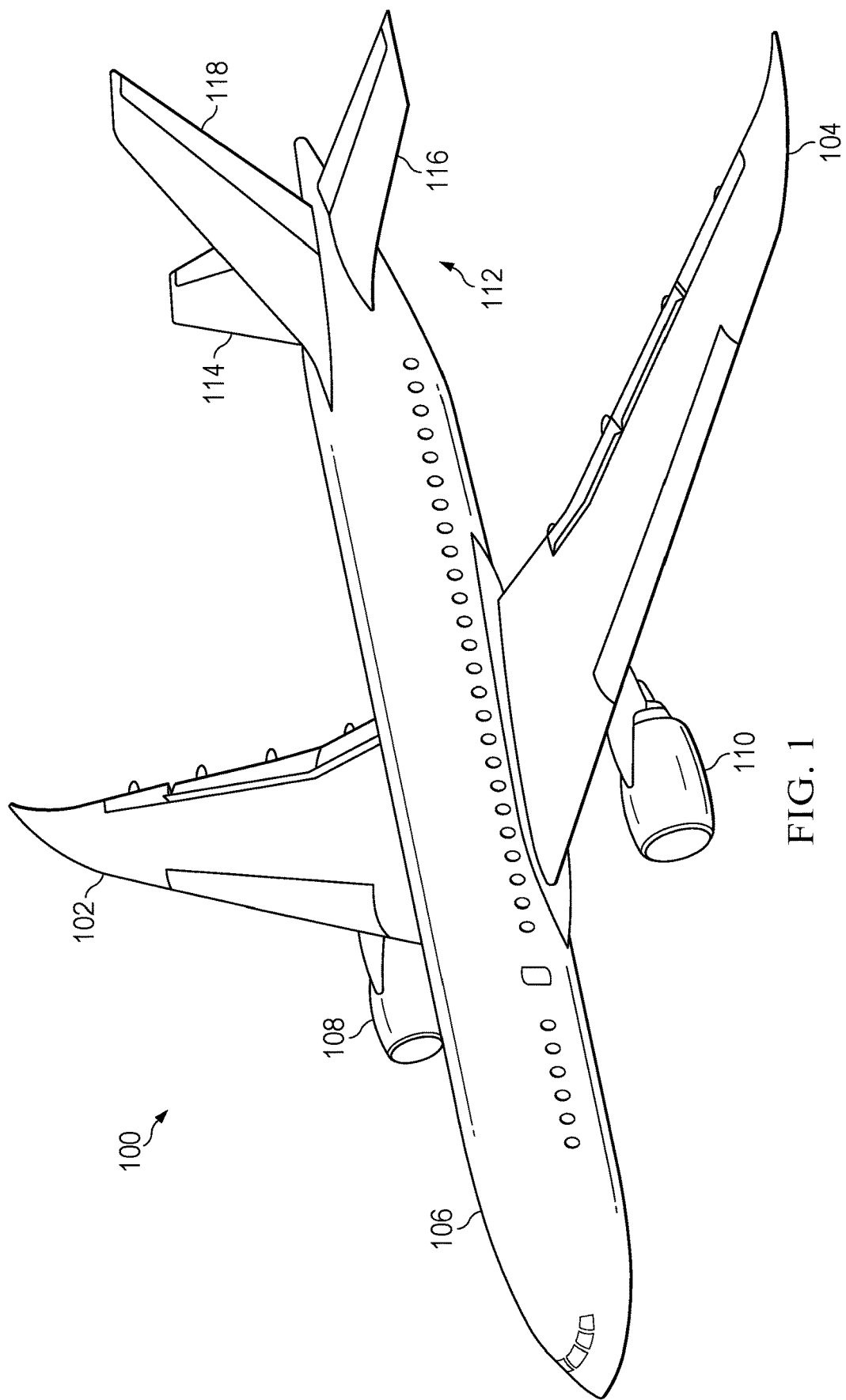
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have components laid up using restart assemblies of the illustrative examples. For example, at least one of wing 102, wing 104, or body 106 can be laid up using an automated fiber placement system having a restart assembly of the illustrative examples.

Figure 2:
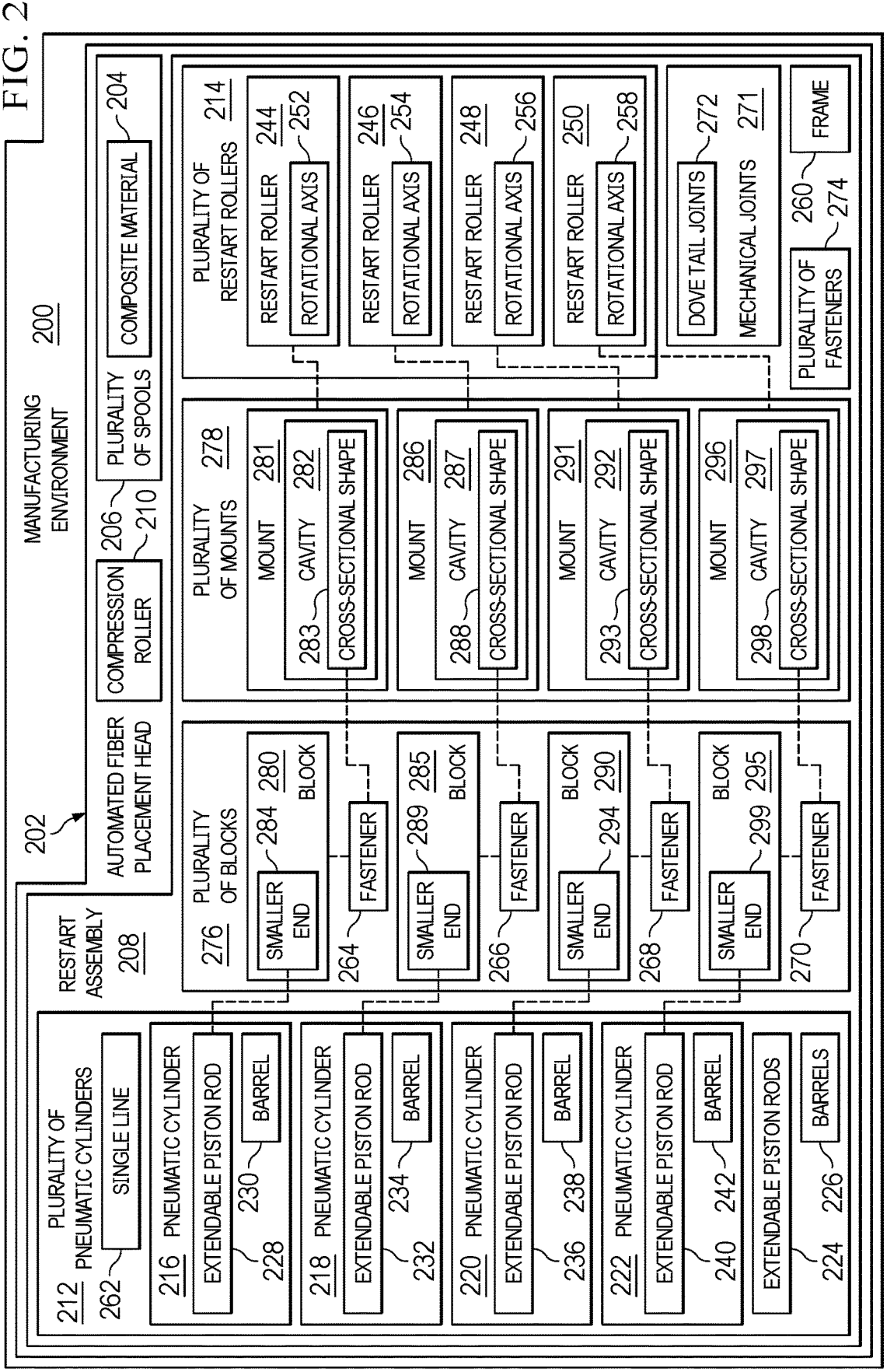
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Automated fiber placement head 202 in manufacturing environment 200 is configured to lay down composite material 204 from plurality of spools 206.

Automated fiber placement head 202 comprises compression roller 210, plurality of spools 206 of composite material 204, and restart assembly 208 positioned between plurality of spools 206 of composite material 204 and compression roller 210 and configured to direct composite material 204 from plurality of spools 206 to compression roller 210.

In some illustrative examples, restart assembly 208 comprises plurality of pneumatic cylinders and plurality of restart rollers. Each pneumatic cylinder of the plurality of pneumatic cylinders comprises an extendable piston rod. Each restart roller of the plurality of restart rollers connected to a respective extendable piston rod of the plurality of pneumatic cylinders, movement of the plurality of restart rollers parallel to the movement of the respective extendable piston rod.

In some illustrative examples, restart assembly 208 comprises plurality of pneumatic cylinders 212 and plurality of restart rollers 214. Each pneumatic cylinder of plurality of pneumatic cylinders 212 comprises an extendable piston rod. Each restart roller of plurality of restart rollers 214 is connected to a respective extendable piston rod of plurality of pneumatic cylinders 212. A rotational axis of each restart roller of plurality of restart rollers 214 is perpendicular to the respective extendable piston rod connected to the restart roller.

As depicted, plurality of pneumatic cylinders 212 comprises pneumatic cylinder 216, pneumatic cylinder 218, pneumatic cylinder 220, and pneumatic cylinder 222. Although only four pneumatic cylinders are depicted in plurality of pneumatic cylinders 212 for ease of explanation, plurality of pneumatic cylinders 212 comprises any desirable quantity of cylinders. In some illustrative examples, plurality of pneumatic cylinders 212 comprises more than ten pneumatic cylinders. A quantity of pneumatic cylinders in plurality of pneumatic cylinders 212 is provided based on a desired width of composite material to be laid down by automated fiber placement head 202.

Plurality of pneumatic cylinders 212 comprises extendable piston rods 224 and barrels 226. Each pneumatic cylinder of plurality of pneumatic cylinders 212 comprises a respective extendable piston rod of extendable piston rods 224 and a respective barrel of barrels 226. Pneumatic cylinder 216 comprises extendable piston rod 228 and barrel 230. Pneumatic cylinder 218 comprises extendable piston rod 232 and barrel 234. Pneumatic cylinder 220 comprises extendable piston rod 236 and barrel 238. Pneumatic cylinder 222 comprises extendable piston rod 240 and barrel 242.

Plurality of restart rollers 214 comprises restart roller 244, restart roller 246, restart roller 248, and restart roller 250. Each restart roller of plurality of restart rollers 214 is connected to a respective extendable piston rod of extendable piston rods 224. For example, restart roller 244 is connected to extendable piston rod 228. Restart roller 246 is connected to extendable piston rod 232. Restart roller 248 is connected to extendable piston rod 236. Restart roller 250 is connected to extendable piston rod 232.

Movement of plurality of restart rollers 214 is parallel to the movement of the respective extendable piston rod. For example, restart roller 244 will move parallel to the movement of extendable piston rod 228. Restart roller 246 will move parallel to the movement of extendable piston rod 232. Restart roller 248 will move parallel to the movement of extendable piston rod 236. Restart roller 250 will move parallel to the movement of extendable piston rod 240.

A rotational axis of each restart roller of plurality of restart rollers 214 is perpendicular to the respective extendable piston rod connected to the restart roller. Rotational axis 252 of restart roller 244 is perpendicular to extendable piston rod 228 connected to restart roller 244. Rotational axis 254 of restart roller 246 is perpendicular to extendable piston rod 232 connected to restart roller 246. Rotational axis 256 of restart roller 248 is perpendicular to extendable piston rod 236 connected to restart roller 248. Rotational axis 258 of restart roller 250 is perpendicular to extendable piston rod 240 connected to restart roller 250.

Barrels 226 of plurality of pneumatic cylinders 212 are rigidly mounted to frame 260. Barrels 226 of plurality of pneumatic cylinders 212 are stationary relative to frame 260 during operation of restart assembly 208. Extendable piston rods 224 of plurality of pneumatic cylinders 212 and the plurality of restart rollers 214 move perpendicular relative to frame 260 during operation of restart assembly 208.

In some illustrative examples, plurality of pneumatic cylinders 212 can be mounted in a direction referred to as "vertical". This vertical mounting is parallel to the movement of plurality of restart rollers 214 when plurality of pneumatic cylinders 212 is actuated. In some illustrative examples, plurality of pneumatic cylinders 212 is mounted in restart assembly 208 perpendicular to a rotational axis of plurality of restart rollers 214. Plurality of pneumatic cylinders 212 are smaller than pneumatic cylinders in conventional restarts to fit within restart assembly 208.

In some illustrative examples, plurality of pneumatic cylinders 212 is arranged in single line 262 of pneumatic cylinders. In some illustrative examples, rotational axes of plurality of restart rollers 214 are parallel to each other. In some illustrative examples, the rotational axes of plurality of restart rollers 214 are substantially the same. For example, rotational axis 252 can be substantially the same as rotational axis 254.

Restart assembly 208 is designed for ease of maintenance including repair and replacement of plurality of pneumatic cylinders 212 and plurality of restart rollers 214. Restart assembly 208 is designed such that each of plurality of restart rollers 214 can be removed from restart assembly 208 without disassembling the remainder of plurality of restart rollers 214.

In some illustrative examples, each restart roller of plurality of restart rollers 214 is releasable from the respective extendable piston rod by removing a single fastener. In some illustrative examples, restart roller 244 is releasable from extendable piston rod 228 by removing fastener 264. In some illustrative examples, restart roller 246 is releasable from extendable piston rod 232 by removing fastener 266. In some illustrative examples, restart roller 248 is releasable from extendable piston rod 236 by removing fastener 268. In some illustrative examples, restart roller 250 is releasable from extendable piston rod 240 by removing fastener 270.

In some illustrative examples, a respective restart roller is removable from the respective extendable piston rod by sliding the respective restart roller in a direction perpendicular to the rotational axis of the respective restart roller and perpendicular to the respective extendable piston rod. In some illustrative examples, restart roller 244 is removable from extendable piston rod 228 by sliding restart roller 244 in a direction perpendicular to rotational axis 252 and perpendicular to extendable piston rod 228. In some illustrative examples, restart roller 246 is removable from extendable piston rod 232 by sliding restart roller 246 in a direction perpendicular to rotational axis 254 and perpendicular to extendable piston rod 232. In some illustrative examples, restart roller 248 is removable from extendable piston rod 236 by sliding restart roller 248 in a direction perpendicular to rotational axis 256 and perpendicular to extendable piston rod 236. In some illustrative examples, restart roller 250 is removable from extendable piston rod 240 by sliding restart roller 250 in a direction perpendicular to rotational axis 258 and perpendicular to extendable piston rod 240.

In some illustrative examples, each respective restart roller is connected to a respective extendable piston rod by a dove tail joint. In these illustrative examples, plurality of restart rollers 214 is connected to extendable piston rods 224 by dove tail joints 272.

As depicted, plurality of restart rollers 214 can be connected to extendable piston rods 224 by plurality of blocks 276 and plurality of mounts 278. In some illustrative examples, each respective block is connected to an end of a respective extendable piston rod on a smaller end of the respective block. In some illustrative examples, each mount holds a respective restart roller and has a cavity with a cross-sectional shape configured to receive a respective block to form a mechanical joint with the respective block.

Plurality of blocks 276 is connected to plurality of extendable piston rods 224 of plurality of pneumatic cylinders 212. Plurality of mounts 278 is connected to plurality of restart rollers 214. Plurality of blocks 276 is mechanically joined to plurality of mounts 278.

As depicted, block 280 is connected to an end of extendable piston rod 228. Mount 281 holds restart roller 244 and has cavity 282 with cross-sectional shape 283 configured to receive block 280 to form a mechanical joint with block 280. In some illustrative examples, extendable piston rod 228 is connected to smaller end 284 of block 280. In some of these illustrative examples, the mechanical joint can be a dove tail joint of dove tail joints 272.

As depicted, block 285 is connected to an end of extendable piston rod 232. Mount 286 holds restart roller 246 and has cavity 287 with cross-sectional shape 288 configured to receive block 285 to form a mechanical joint with block 285. In some illustrative examples, extendable piston rod 232 is connected to smaller end 289 of block 285. In some of these illustrative examples, the mechanical joint can be a dove tail joint of dove tail joints 272.

As depicted, block 290 is connected to an end of extendable piston rod 236. Mount 291 holds restart roller 246 and has cavity 292 with cross-sectional shape 293 configured to receive block 290 to form a mechanical joint with block 290. In some illustrative examples, extendable piston rod 236 is connected to smaller end 294 of block 290. In some of these illustrative examples, the mechanical joint can be a dove tail joint of dove tail joints 272.

As depicted, block 295 is connected to an end of extendable piston rod 240. Mount 296 holds restart roller 250 and has cavity 297 with cross-sectional shape 298 configured to receive block 295 to form a mechanical joint with block 295. In some illustrative examples, extendable piston rod 240 is connected to smaller end 299 of block 295. In some of these illustrative examples, the mechanical joint can be a dove tail joint of dove tail joints 272.

In some illustrative examples, plurality of fasteners 274 secures the mechanical joints between plurality of blocks 276 and plurality of mounts 278. In some illustrative examples, a mechanical joint between a respective block and a respective mount is a dove tail joint. However, a mechanical joint can take any desirable form. In some illustrative examples, a single fastener of plurality of fasteners 274 joins a respective mount of plurality of mounts 278 to a respective block of plurality of blocks 276. For ease of maintenance and replacement, in some illustrative examples, each single fastener is accessible, and each restart roller is removable without removing other restart rollers of plurality of restart rollers 214.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, for ease of illustration, plurality of restart rollers 214 only includes four restart rollers as depicted. However, any desirable quantity of restart rollers can be provided in restart assembly 208.

Figure 3:
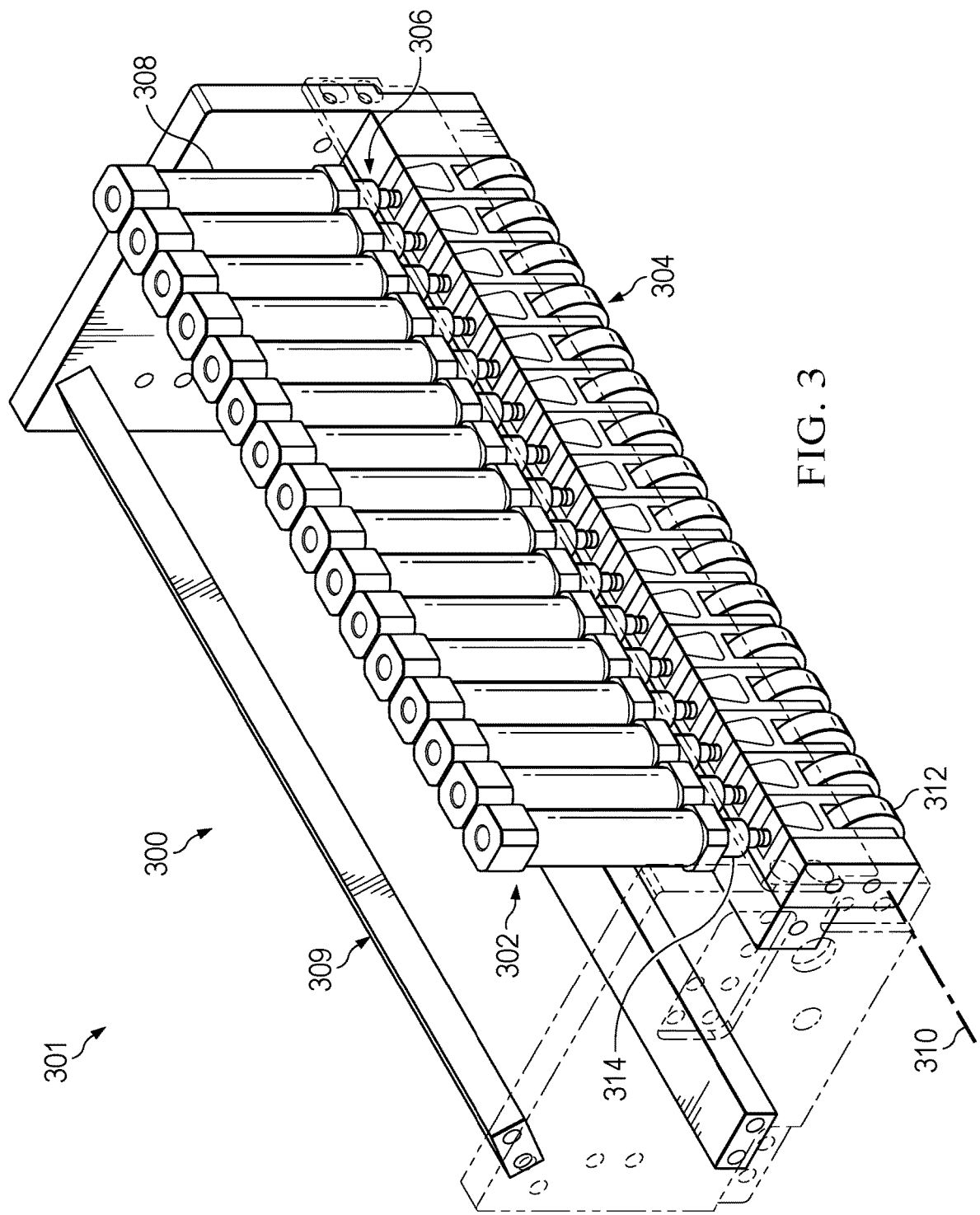
FIG. 3 is an illustration of an isometric view of a restart assembly for an automated fiber placement head in accordance with an illustrative embodiment.

Turning now to FIG. 3, an illustration of an isometric view of a restart assembly for an automated fiber placement head is depicted in accordance with an illustrative embodiment. Restart assembly 300 is a physical implementation of restart assembly 208 of FIG. 2. Restart assembly 300 can be used in automated fiber placement head 202 of FIG. 2.

Restart assembly 300 comprises plurality of pneumatic cylinders 302 and plurality of restart rollers 304. Each pneumatic cylinder of plurality of pneumatic cylinders 302 comprises an extendable piston rod. As can been seen in view 301, plurality of pneumatic cylinders 302 comprises extendable piston rods 306 and barrels 308.

Barrels 308 of plurality of pneumatic cylinders 302 are rigidly mounted to frame 309. As barrels 308 are rigidly mounted to frame 309, barrels 308 are held stationary relative to frame 309 during operation of restart assembly 300. During operation of restart assembly 300, extendable piston rods 306 move relative to barrels 308 and frame 309 while barrels 308 remain stationary relative to frame 309.

Each restart roller of plurality of restart rollers 304 is connected to a respective extendable piston rod of plurality of pneumatic cylinders 302. A rotational axis of each restart roller of plurality of restart rollers 304 is perpendicular to the respective extendable piston rod connected to the restart roller. For example, rotational axis 310 of restart roller 312 is perpendicular to extendable piston rod 314 connected to restart roller 312.

Extendable piston rods 306 of plurality of pneumatic cylinders 302 and plurality of restart rollers 304 move perpendicular relative to frame 309 during operation of restart assembly 300. Plurality of pneumatic cylinders 302 is arranged in a single line of pneumatic cylinders.

Each restart roller of the plurality of restart rollers 304 is releasable from the respective extendable piston rod by removing a single fastener. In view 301, the fasteners are not visible.

Figure 4:
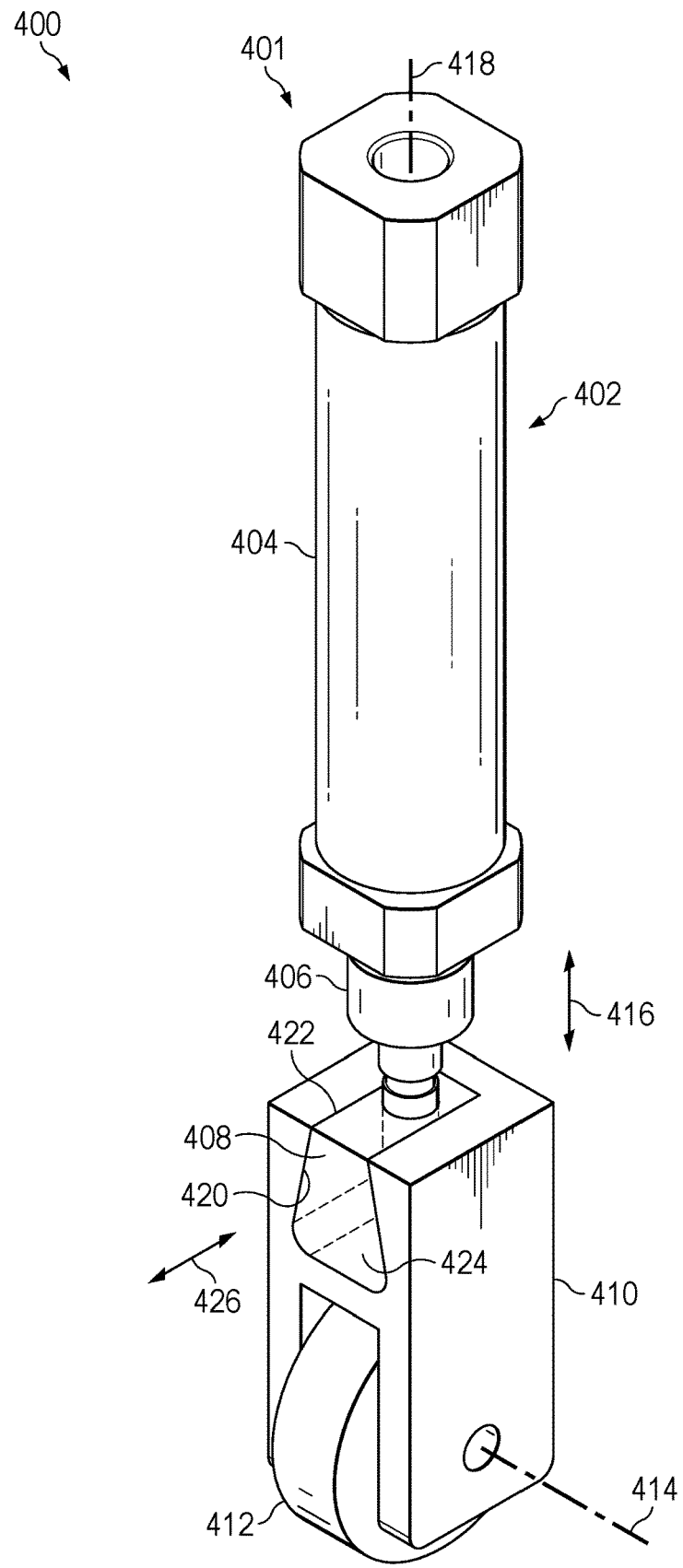
FIG. 4 is an illustration of an isometric back view of a pneumatic cylinder and a restart roller in accordance with an illustrative embodiment.

Turning now to FIG. 4, an illustration of an isometric back view of a pneumatic cylinder and a restart roller is depicted in accordance with an illustrative embodiment. View 400 is a view of assembly 401 of a single pneumatic cylinder and a single restart roller of a restart assembly, such as restart assembly 208 of FIG. 2. Pneumatic cylinder 402 is a physical implementation of a pneumatic cylinder of plurality of pneumatic cylinders 212 of FIG. 2. Pneumatic cylinder 402 can be one of plurality of pneumatic cylinders 302 of FIG. 3.

Pneumatic cylinder 402 comprises barrel 404 and extendable piston rod 406. Block 408 is connected to extendable piston rod 406. Block 408 and mount 410 holding restart roller 412 form a mechanical joint. Block 408 and mount 410 connect restart roller 412 to extendable piston rod 406.

Restart roller 412 is a physical implementation of a restart roller of plurality of restart rollers 214 of FIG. 2. Restart roller 412 can be one of plurality of restart rollers 304.

Rotational axis 414 of restart roller 412 is substantially perpendicular to extendable piston rod 406. Rotational axis 414 of restart roller 412 is substantially perpendicular to direction 416 of movement of extendable piston rod 406.

As extendable piston rod 406 moves in direction 416, restart roller 412 also moves in direction 416. There is no rotational or pivot movements in between movement of extendable piston rod 406 and restart roller 412. The movement of extendable piston rod 406 in direction 416 directly creates movement of restart roller 412 in direction 416. In other words, as extendable piston rod 406 moves towards or away from barrel 404 of pneumatic cylinder 402, restart roller 412 also moves towards or away from barrel 404.

Pneumatic cylinder 402 has longitudinal axis 418. Barrel 404 and extendable piston rod 406 are co-axial and also have longitudinal axis 418.

Block 408 is connected to an end of respective extendable piston rod 406 on smaller end 422 of block 408. Mount 410 has cavity 420 with cross-sectional shape 424 configured to receive block 408 to form a mechanical joint with block 408.

Restart roller 412 can be removed from pneumatic cylinder 402 by moving mount 410 in direction 426. By sliding mount 410 onto block 408, the mechanical joint is formed between block 408 and mount 410. By sliding mount 410 off of block 408, restart roller 412 can be removed and replaced.

Figure 5:
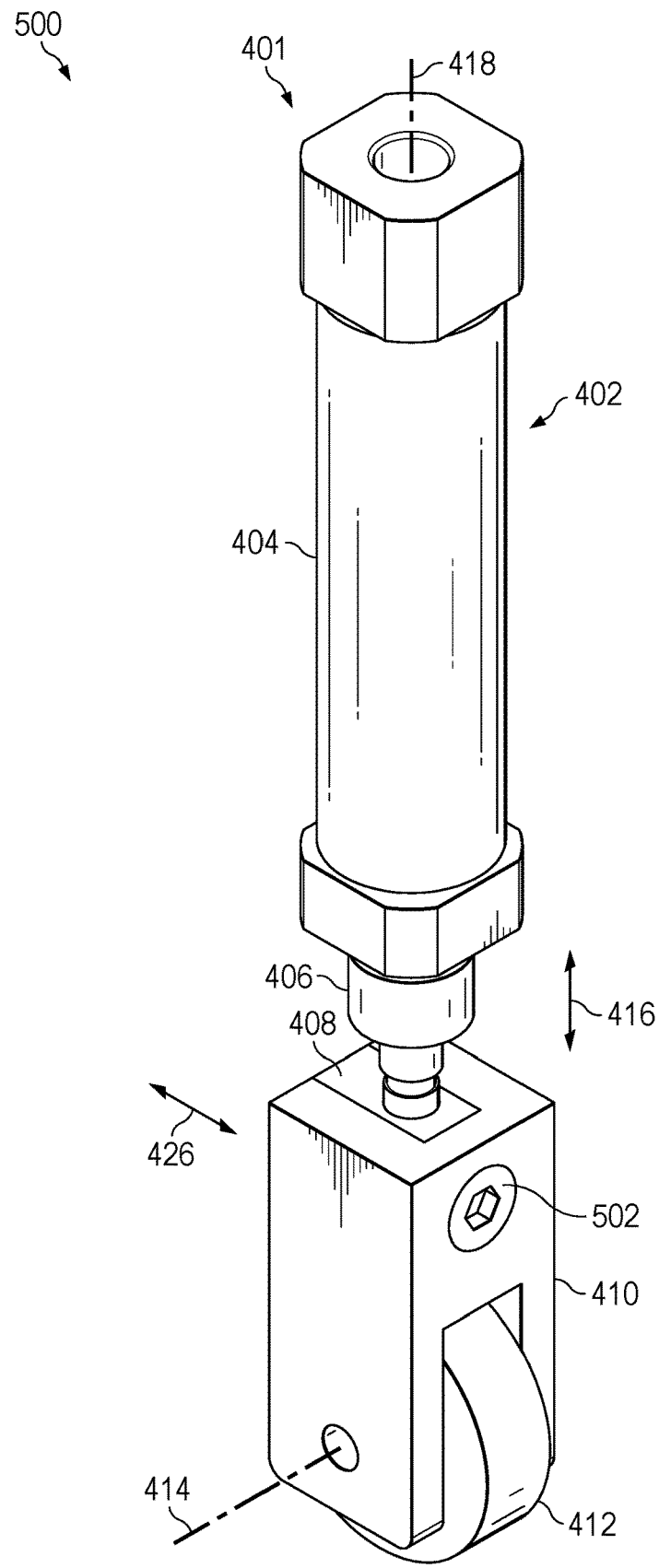
FIG. 5 is an illustration of an isometric back view of a pneumatic cylinder and a restart roller in accordance with an illustrative embodiment.

Turning now to FIG. 5, an illustration of an isometric back view of a pneumatic cylinder and a restart roller is depicted in accordance with an illustrative embodiment. View 500 is a front view of assembly 401. In view 400, fastener 502 is visible. To remove restart roller 412, fastener 502 is removed from block 408 and mount 410. After fastener 502 is removed from block 408 and mount 410, mount 410 can be moved in direction 426 to remove restart roller 412 from assembly 401.

Figure 6:
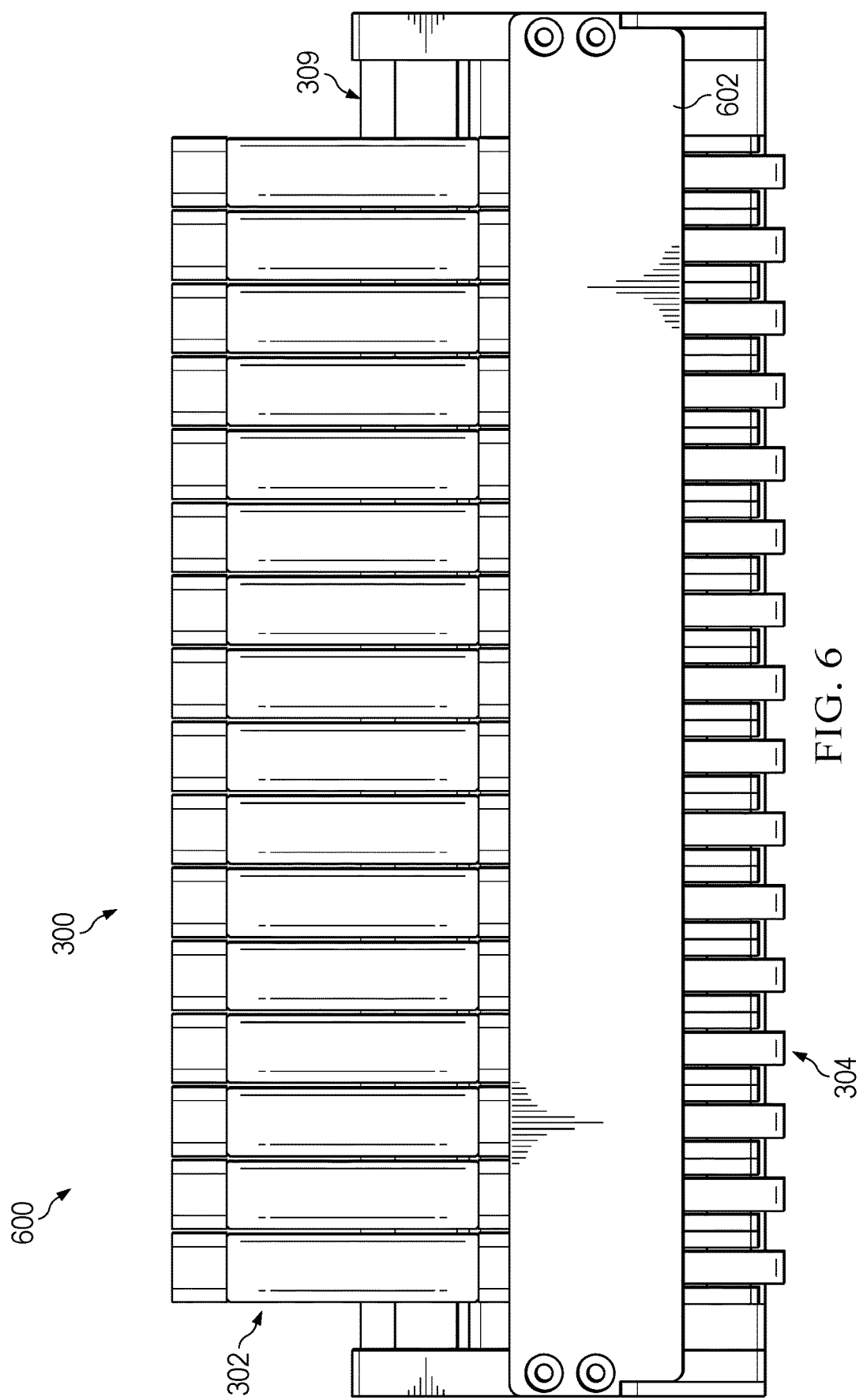
FIG. 6 is an illustration of a back view of a restart assembly for an automated fiber placement head in accordance with an illustrative embodiment.

Turning now to FIG. 6, an illustration of a back view of a restart assembly for an automated fiber placement head is depicted in accordance with an illustrative embodiment. View 600 is a back view of restart assembly 300 of FIG. 3. In view 600 restart assembly 300 is fully assembled. In view 600, brace 602 of frame 309 is blocking visibility of mounts and blocks connecting plurality of pneumatic cylinders 302 to plurality of restart rollers 304.

Figure 7:
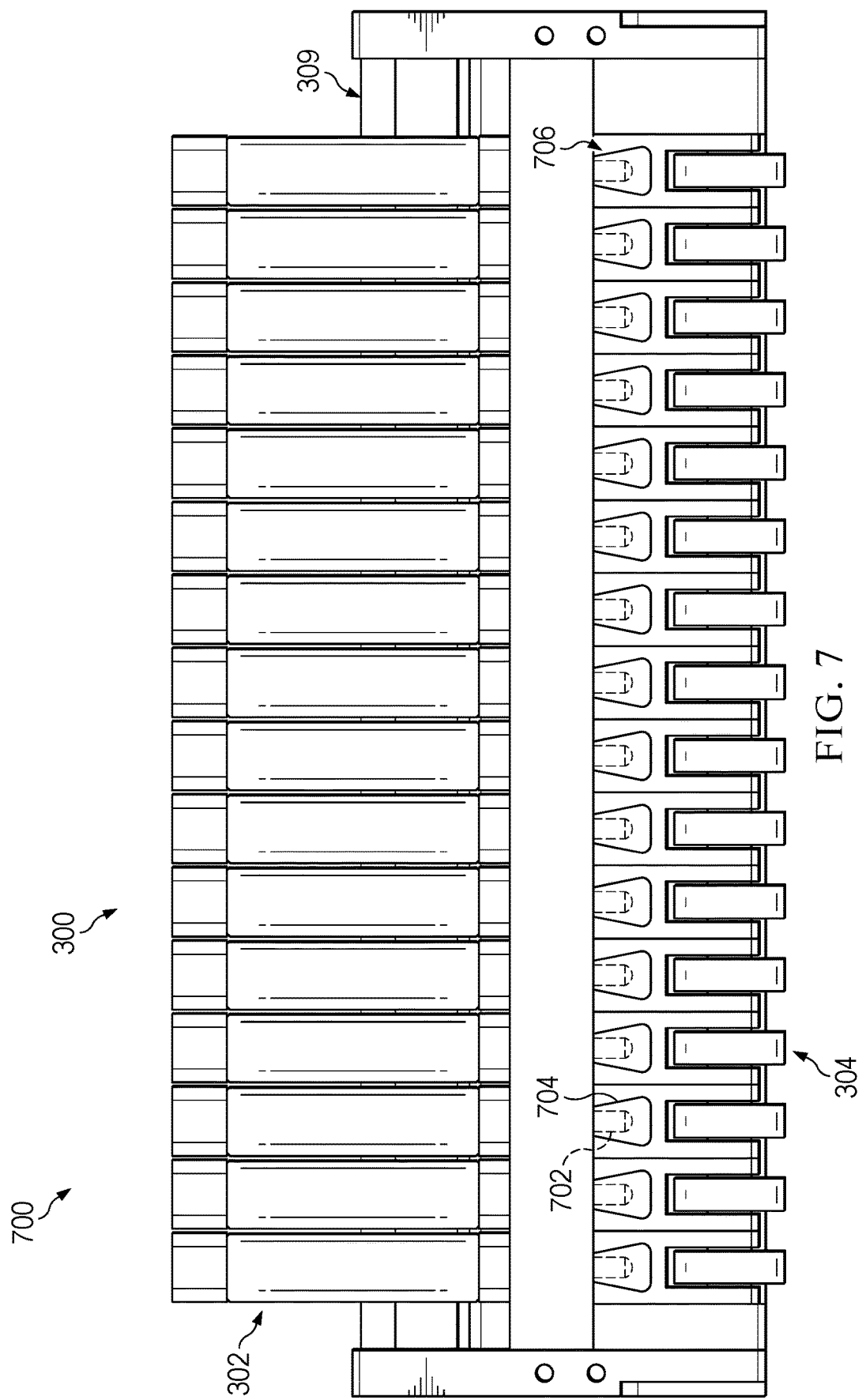
FIG. 7 is an illustration of a partially disassembled back view of a restart assembly for an automated fiber placement head in accordance with an illustrative embodiment.

Turning now to FIG. 7, an illustration of a partially disassembled back view of a restart assembly for an automated fiber placement head is depicted in accordance with an illustrative embodiment. View 700 is a back view of restart assembly 300 of FIG. 3 with some components removed for visibility.

In view 700, it can be seen that any of plurality of restart rollers 304 can be removed by sliding a respective mount of plurality of mounts 704 from a respective block of plurality of blocks 702. Each of plurality of blocks 702 secures plurality of restart rollers 304 to plurality of pneumatic cylinders 302 through mechanical joints 706. As depicted, mechanical joints 706 take the form of dove tail joints.

Figure 8:
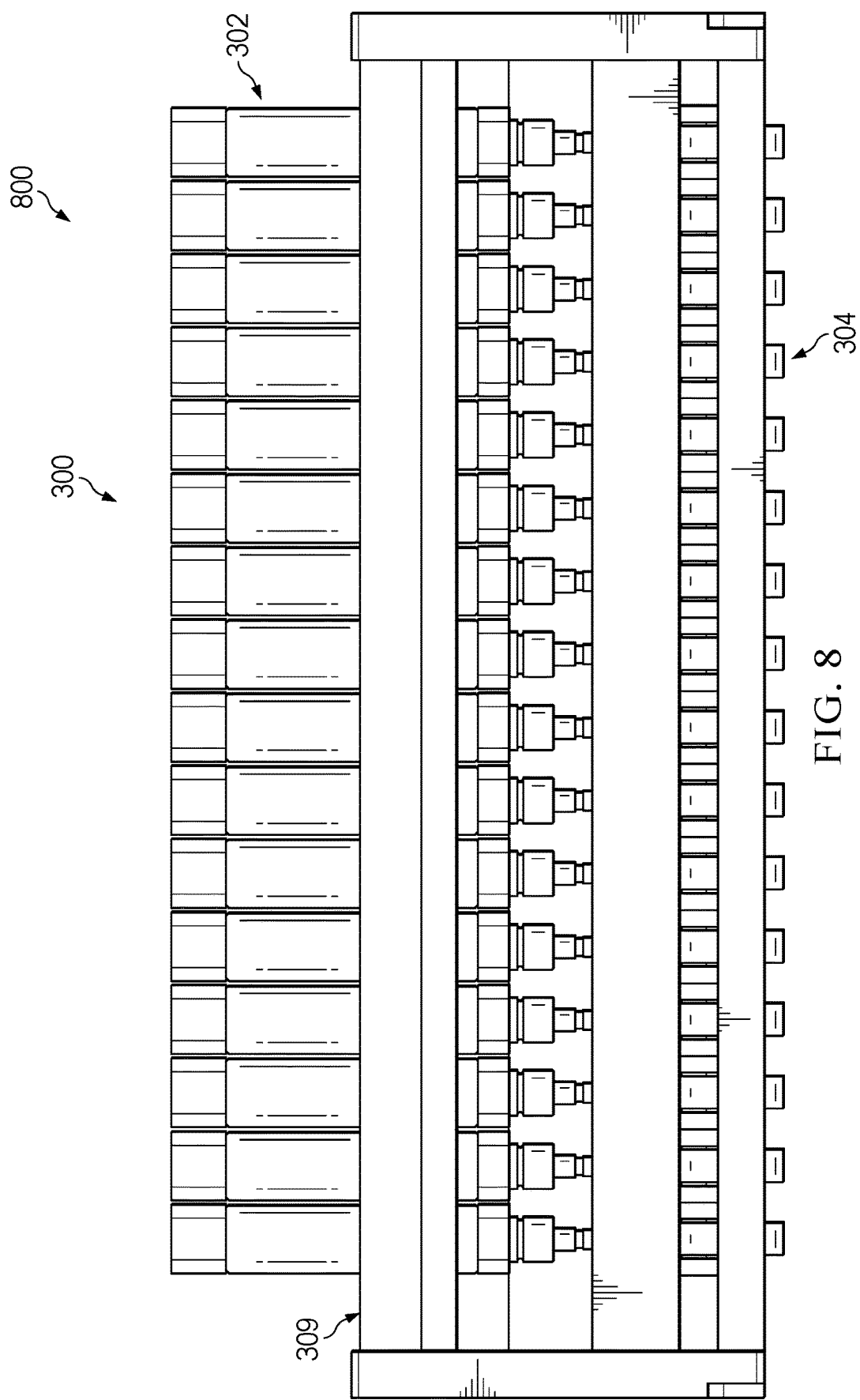
FIG. 8 is an illustration of a front view of a restart assembly for an automated fiber placement head in accordance with an illustrative embodiment.

Turning now to FIG. 8, an illustration of a front view of a restart assembly for an automated fiber placement head is depicted in accordance with an illustrative embodiment. View 800 is a front view of restart assembly 300. In view 800, frame 309 obscures the connections between plurality of pneumatic cylinders 302 and plurality of restart rollers 304. In view 800, frame 309 blocks a view of the joints between extendable piston rods 306 and plurality of restart rollers 304.

To remove a respective restart roller of plurality of restart rollers 304, a portion of frame 309 is removed to allow access to fasteners securing plurality of pneumatic cylinders 302 and plurality of restart rollers 304. In some illustrative examples, component 802 is removed to access fasteners securing plurality of blocks 702 of FIG. 7 to mounts 704.

Figure 9:
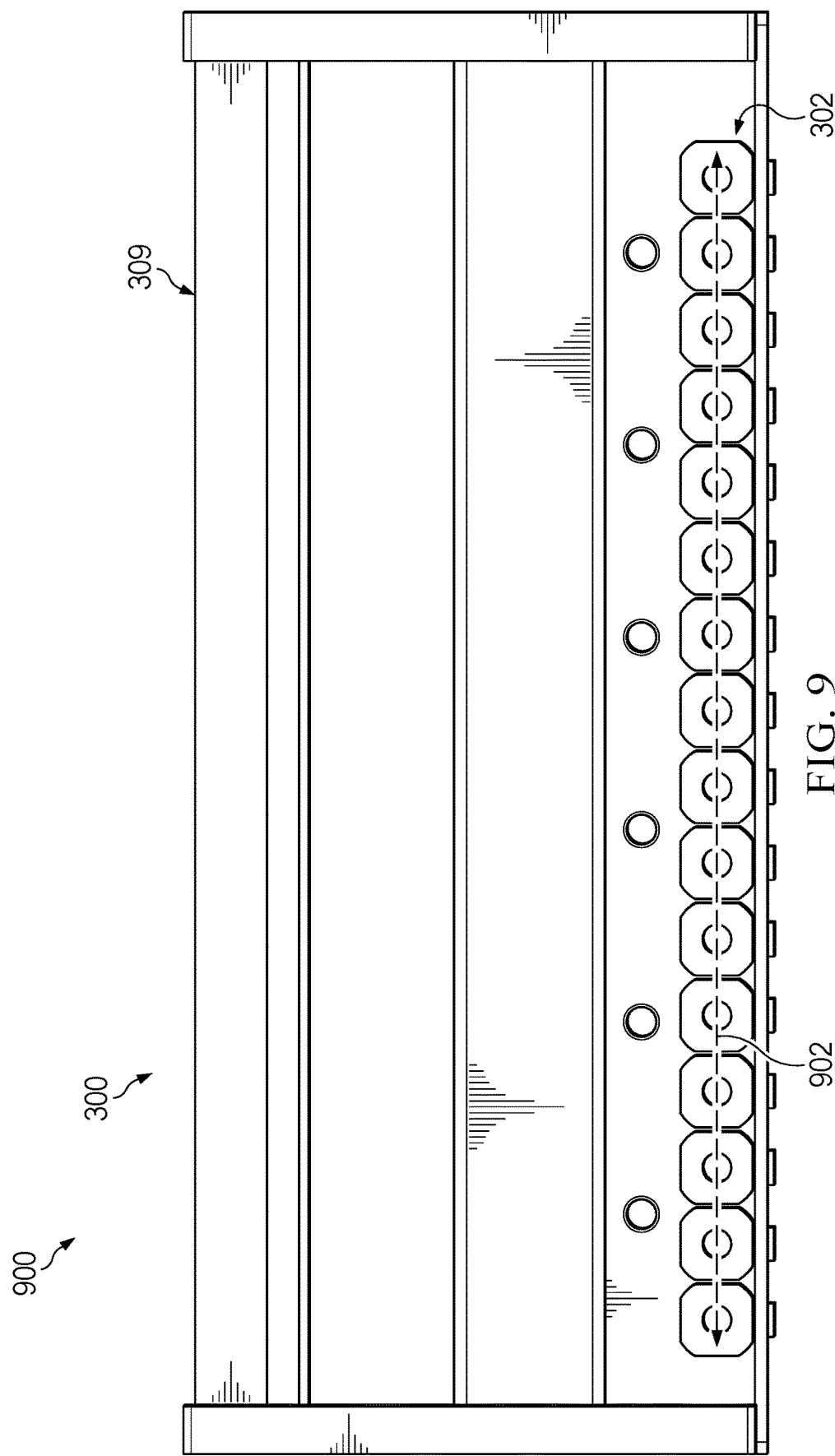
FIG. 9 is an illustration of a top view of a restart assembly for an automated fiber placement head in accordance with an illustrative embodiment.

Turning now to FIG. 9, an illustration of a top view of a restart assembly for an automated fiber placement head is depicted in accordance with an illustrative embodiment. View 900 is a top view of restart assembly 300. In view 900, the linear alignment of plurality of pneumatic cylinders 302 is visible. In view 900, each of plurality of pneumatic cylinders 302 is positioned along line 902. By each of plurality of pneumatic cylinders 302 being positioned along line 902, each of plurality of pneumatic cylinders 302 is positioned above a respective restart roller of plurality of restart rollers 304 of FIG. 3. By each of plurality of pneumatic cylinders 302 being positioned along line 902, each of plurality of pneumatic cylinders 302 can be removed from restart assembly 300 without disassembling all of plurality of pneumatic cylinders 302.

Figure 10:
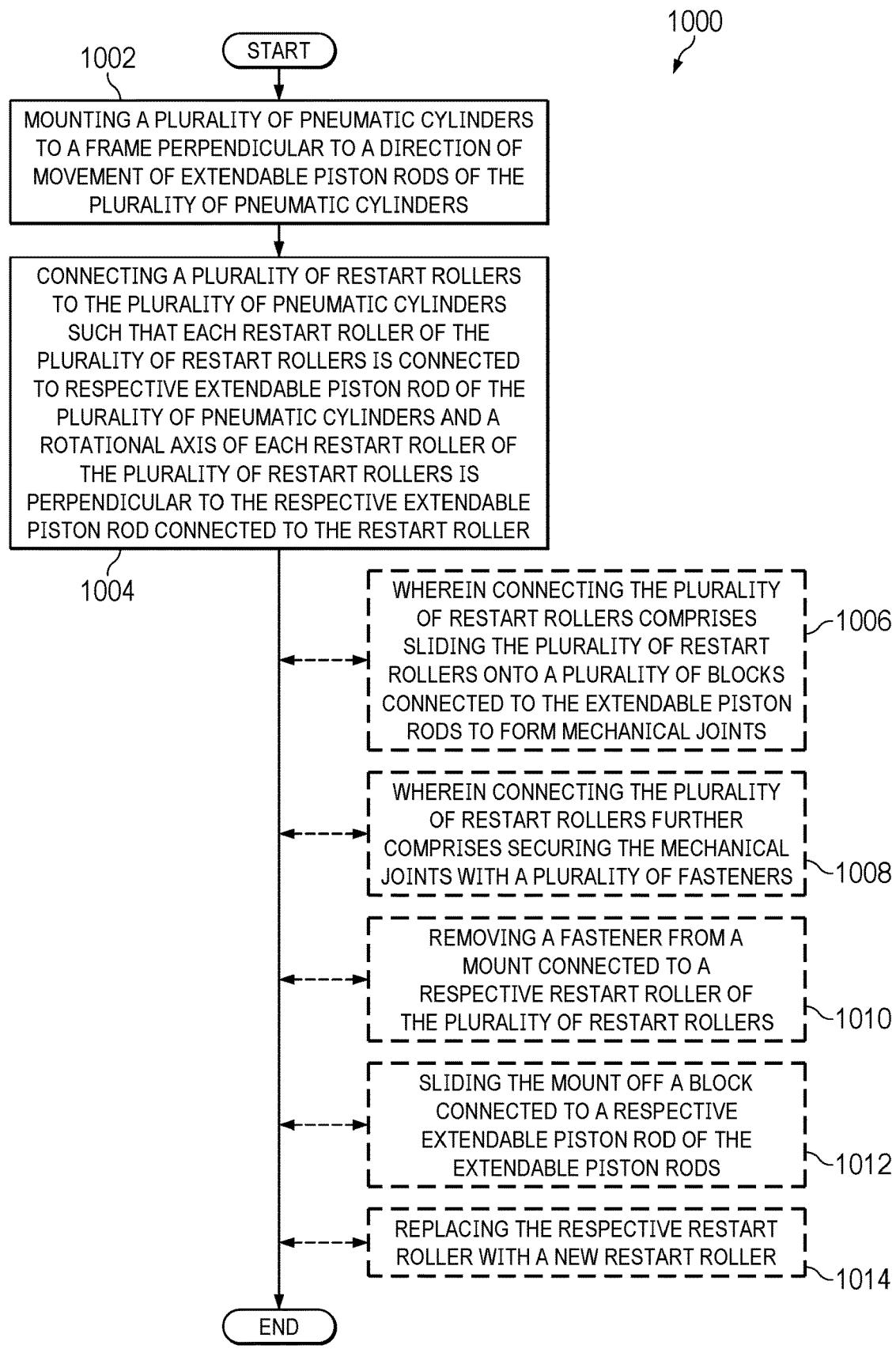
FIG. 10 is a flowchart of a method of assembling a restart assembly of an automated fiber placement head in accordance with an illustrative embodiment.

Turning now to FIG. 10, a flowchart of a method of assembling a restart assembly of an automated fiber placement head is depicted in accordance with an illustrative embodiment. Method 1000 can be used to assemble restart assembly 208 of FIG. 2. Method 1000 can be used to assemble restart assembly 300 of FIGS. 3, and 6-9. Method 1000 can be applied to assembly 401 of FIGS. 4 and 5 to form a restart assembly.

Method 1000 mounts a plurality of pneumatic cylinders to a frame perpendicular to a direction of movement of extendable piston rods of the plurality of pneumatic cylinders (operation 1002). Method 1000 connects a plurality of restart rollers to the plurality of pneumatic cylinders such that each restart roller of the plurality of restart rollers is connected to a respective extendable piston rod of the plurality of pneumatic cylinders and a rotational axis of each restart roller of the plurality of restart rollers is perpendicular to the respective extendable piston rod connected to the restart roller (operation 1004). Afterwards, method 1000 terminates.

In some illustrative examples, connecting the plurality of restart rollers comprises sliding the plurality of restart rollers onto a plurality of blocks connected to the extendable piston rods to form mechanical joints (operation 1006). In some illustrative examples the mechanical joints take the form of dove tail joints. In some illustrative examples, connecting the plurality of restart rollers further comprises securing the mechanical joints with a plurality of fasteners (operation 1008). In some illustrative examples, a single respective fastener of the plurality of fasteners secures a respective mechanical joint.

In some illustrative examples, method 1000 further comprises removing a fastener from a mount connected to a respective restart roller of the plurality of restart rollers (operation 1010). When a single fastener secures a mechanical joint, removing the single fastener allows for movement of the mount relative to the block. In some illustrative examples, method 1000 further comprises sliding the mount off of a block connected to a respective extendable piston rod of the extendable piston rods (operation 1012). In some illustrative examples, method 1000 further comprises replacing the respective restart roller with a new restart roller (operation 1014).

The mechanical joint and fasteners are configured such that the mount can be removed from the block without disassembling all of the restart rollers within the restart assembly. The restart assembly is configured such that each pneumatic cylinder can be replaced without disassembly of all of the plurality of pneumatic cylinders. The restart assembly is configured such that a respective pneumatic cylinder can be replaced without disassembly of the restart assembly as a whole. The restart assembly is configured such that at least one of a respective restart roller or a respective pneumatic cylinder can be removed and replaced after removing only frame components obscuring the respective restart roller or respective pneumatic cylinder.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination of items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1006 through operation 1014 may be optional.

Figure 11:
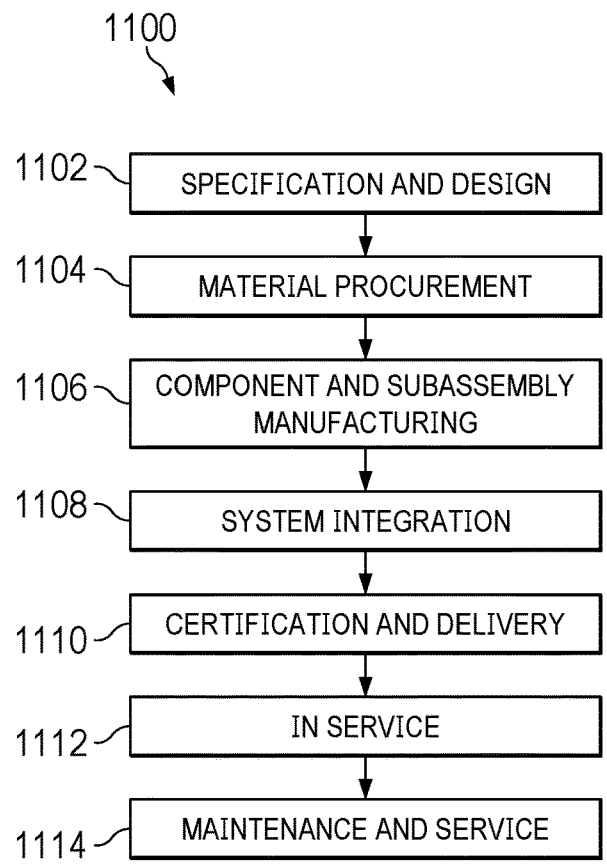
FIG. 11 is an illustration of an aircraft manufacturing and service method in a form of a block diagram in accordance with an illustrative embodiment.
Figure 12:
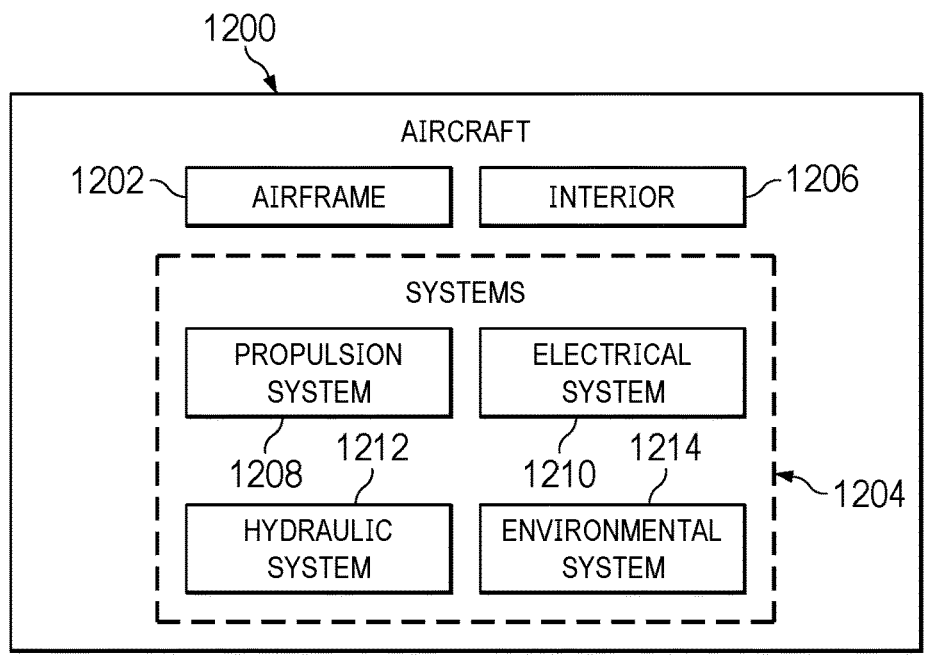
FIG. 12 is an illustration of an aircraft in a form of a block diagram in which an illustrative embodiment may be implemented.

Illustrative embodiments of the present disclosure may be described in the context of aircraft manufacturing and service method 1100 as shown in FIG. 11 and aircraft 1200 as shown in FIG. 12. Turning first to FIG. 11, an illustration of an aircraft manufacturing and service method in a form of a block diagram is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 takes place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, or other maintenance and service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft in a form of a block diagram is depicted in which an illustrative embodiment may be implemented. In this example, aircraft 1200 is produced by aircraft manufacturing and service method 1100 of FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included.

Apparatuses and methods embodied herein may be employed during at least one of the stages of aircraft manufacturing and service method 1100. One or more illustrative embodiments may be manufactured or used during at least one of component and subassembly manufacturing 1106, system integration 1108, in service 1112, or maintenance and service 1114 of FIG. 11.

The illustrative examples provide new designs for a restart assembly for an automated fiber placement head. The restart assembly of the illustrative examples has fewer parts than conventional assemblies. The restart assembly of the illustrative examples provides direct movement transfer from an extendable piston to the restart roller. The restart assembly of the illustrative examples is designed for easier maintenance.

Maintenance can be performed on the restart assembly of the illustrative examples without dissembling the whole restart assembly. Pneumatic cylinders can be replaced without disassembling the whole restart assembly.

Pneumatic cylinders of the illustrative examples can be a lower cost than conventional larger pneumatic cylinders. The illustrative examples provide restart assemblies with fewer components. Cost of the restart assembly is less than conventional restarts due to fewer components, less complicated components, and less downtime.

In the illustrative examples, the pneumatic cylinders have a stationary operating condition. In the illustrative examples, the pistons of the pneumatic cylinders travel up and down, in the same direction of the movement of the restart rollers. No pivot is included in the movement of the restart assembly. Less wear is placed on the shaft of the pistons due to the movement direction of the pistons being the same as the movement direction of the restart rollers. By reducing wear on the pistons, the replacement frequency of the pneumatic cylinders can also be reduced.

The illustrative examples use a smaller pneumatic cylinder than conventional assemblies. The smaller pneumatic cylinders fit within a small frame size of an automated fiber placement (AFP) machine. The illustrative examples enable replacement of individual air cylinders and/or restart rollers without disassembling the entire restart assembly. In some illustrative examples, an individual roller can be removed and replaced by removing a single fastener. The smaller air cylinders of the illustrative examples are less expensive.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A restart assembly for an automated fiber placement head comprising:
    a plurality of pneumatic cylinders, each pneumatic cylinder of the plurality of pneumatic cylinders comprising an extendable piston rod; and
    a plurality of restart rollers, each restart roller of the plurality of restart rollers connected to a respective extendable piston rod of the plurality of pneumatic cylinders, a rotational axis of each restart roller of the plurality of restart rollers perpendicular to the respective extendable piston rod connected to the restart roller;
    a plurality of blocks connected to the extendable piston rod of each of the plurality of pneumatic cylinders; and
    a plurality of mounts connected to the plurality of restart rollers, the plurality of blocks mechanically joined to the plurality of mounts; and
    a plurality of fasteners, wherein a single fastener of the plurality of fasteners further joins a respective mount of the plurality of mounts to a respective block of the plurality of blocks.

2. The restart assembly of claim 1, wherein barrels of the plurality of pneumatic cylinders are rigidly mounted to a frame.

3. The restart assembly of claim 2, wherein barrels of the plurality of pneumatic cylinders are stationary relative to the frame during operation of the restart assembly.

4. The restart assembly of claim 2, wherein extendable piston rods of the plurality of pneumatic cylinders and the plurality of restart rollers move perpendicular relative to the frame during operation of the restart assembly.

5. The restart assembly of claim 2, wherein each respective restart roller is connected to a respective extendable piston rod by a dove tail joint.

6. The restart assembly of claim 5 further comprising:
    a plurality of blocks, each respective block connected to an end of the respective extendable piston rod on a smaller end of the respective block; and
    a plurality of mounts, each mount holding a respective restart roller and having a cavity with a cross-sectional shape configured to receive a respective block to form a mechanical joint with the respective block.

7. The restart assembly of claim 1, wherein the plurality of pneumatic cylinders is arranged in a single line of pneumatic cylinders.

8. The restart assembly of claim 1, wherein each restart roller of the plurality of restart rollers is releasable from the respective extendable piston rod by removing a single fastener.

9. The restart assembly of claim 8, wherein a respective restart roller is removable from the respective extendable piston rod by sliding the respective restart roller in a direction perpendicular to the rotational axis of the respective restart roller and perpendicular to the respective extendable piston rod.

10. An automated fiber placement head comprising:
    a compression roller;
    a plurality of spools of composite material;
    a restart assembly positioned between the plurality of spools of composite material and the compression roller and configured to direct composite material from the plurality of spools to the compression roller, the restart assembly comprising:
        a plurality of pneumatic cylinders, each pneumatic cylinder of the plurality of pneumatic cylinders comprising an extendable piston rod;
        a plurality of restart rollers, each restart roller of the plurality of restart rollers connected to a respective extendable piston rod of the plurality of pneumatic cylinders, movement of the plurality of restart rollers parallel to the movement of the respective extendable piston rod;
        a plurality of blocks connected to the extendable piston rod of each of the plurality of pneumatic cylinders; and
        a plurality of mounts connected to the plurality of restart rollers, the plurality of blocks mechanically joined to the plurality of mounts; and a plurality of fasteners, wherein a single fastener of the plurality of fasteners further joins a respective mount of the plurality of mounts to a respective block of the plurality of blocks.

11. The automated fiber placement head of claim 10, wherein the plurality of pneumatic cylinders is positioned in a single line.

12. The automated fiber placement head of claim 10, wherein the plurality of pneumatic cylinders is mounted in the restart assembly perpendicular to a rotational axis of the plurality of restart rollers.

13. The automated fiber placement head of claim 12, wherein each single fastener is accessible and each restart roller is removable without removing other restart rollers of the plurality of restart rollers.

14. The automated fiber placement head of claim 12, wherein a mechanical joint between a respective block and a respective mount is a dove tail joint.

15. The automated fiber placement head of claim 10, wherein each single fastener is accessible and each restart roller is removable without removing other restart rollers of the plurality of restart rollers.

16. The automated fiber placement head of claim 10, wherein a mechanical joint between a respective block and a respective mount is a dove tail joint.

17. A method of assembling a restart assembly of an automated fiber placement head, the method comprising:
mounting a plurality of pneumatic cylinders to a frame perpendicular to a direction of movement of extendable piston rods of the plurality of pneumatic cylinders; and
connecting a plurality of restart rollers to the plurality of pneumatic cylinders such that each restart roller of the plurality of restart rollers is connected to a respective extendable piston rod of the plurality of pneumatic cylinders and a rotational axis of each restart roller of the plurality of restart rollers is perpendicular to the respective extendable piston rod connected to the restart roller,
wherein connecting the plurality of restart rollers comprises sliding the plurality of restart rollers onto a plurality of blocks connected to the extendable piston rods to form a plurality of mechanical joints, and
wherein connecting the plurality of restart rollers further comprises securing the plurality of mechanical joints with a plurality of fasteners.

18. The method of claim 17, wherein a single respective fastener of the plurality of fasteners secures a respective mechanical joint.

19. The method of claim 18, wherein each single fastener is accessible and each restart roller is removable without removing other restart rollers of the plurality of restart rollers.

20. The method of claim 17 further comprising:
removing a fastener from a mount connected to a respective restart roller of the plurality of restart rollers;
sliding the mount off of a block connected to a respective extendable piston rod of the extendable piston rods; and
replacing the respective restart roller with a new restart roller.

* * * * *